(12) United States Patent
He et al.

(10) Patent No.: US 8,125,804 B2
(45) Date of Patent: Feb. 28, 2012

(54) CIRCUIT FOR MINIMIZING STANDBY POWER IN POWER SUPPLY SYSTEMS

(76) Inventors: Shuguang He, Shenzhen (CN); Chun Wah Lam, Hongkong (CN)

( * ) Notice: Subject to any disclaimer, the term of this patent is extended or adjusted under 35 U.S.C. 154(b) by 355 days.

(21) Appl. No.: 12/306,580

(22) PCT Filed: Jul. 20, 2007

(86) PCT No.: PCT/CN2007/002210
§ 371 (c)(1),
(2), (4) Date: Dec. 24, 2008

(87) PCT Pub. No.: WO2008/037167
PCT Pub. Date: Apr. 3, 2008

(65) Prior Publication Data
US 2009/0185402 A1    Jul. 23, 2009

(30) Foreign Application Priority Data
Sep. 22, 2006 (CN) .................. 2006 2 0014851 U

(51) Int. Cl.
*H02M 7/08* (2006.01)
*H02M 7/155* (2006.01)
*H02M 7/162* (2006.01)
(52) U.S. Cl. ............... 363/67; 363/34; 363/44; 363/128
(58) Field of Classification Search .............. 398/202, 398/203, 205, 115; 370/43; 363/37, 48, 363/44, 52–54, 67–70, 84, 85, 123, 125, 363/126, 127, 128; 323/265, 268–271, 282, 323/351
See application file for complete search history.

(56) References Cited

U.S. PATENT DOCUMENTS

| 4,016,458 A * | 4/1977 | Everhart ......................... 361/52 |
| 5,126,930 A * | 6/1992 | Ahn ........................... 363/21.05 |
| 6,043,994 A * | 3/2000 | Keller ............................. 363/19 |
| 6,172,492 B1 * | 1/2001 | Pletcher et al. ............... 323/284 |
| 6,324,082 B1 * | 11/2001 | Keller ............................. 363/37 |
| 6,538,419 B1 * | 3/2003 | Allen et al. ................... 323/285 |
| 6,678,173 B2 * | 1/2004 | Nakagawa ....................... 363/44 |
| 7,061,212 B2 * | 6/2006 | Phadke ......................... 323/222 |
| 7,145,785 B2 * | 12/2006 | Yasumura ....................... 363/16 |
| 7,208,985 B2 * | 4/2007 | Yamashita ..................... 327/108 |
| 2006/0113973 A1 * | 6/2006 | Fukumoto et al. ............ 323/282 |
| 2007/0202932 A1 | 8/2007 | Keller |
| 2008/0049466 A1 * | 2/2008 | Cho ................................. 363/53 |

* cited by examiner

*Primary Examiner* — Gary L Laxton
*Assistant Examiner* — Nusrat Quddus
(74) *Attorney, Agent, or Firm* — Morris Manning & Martin LLP; Tim Tingkang Xia, Esq.

(57) ABSTRACT

The present invention relates to a circuit minimizing standby power in a power adapter with a power-frequency transformer (T1), which includes a sensing circuitry (1), a driving circuitry (2), a switching circuitry (3) and a resistive element (Z). When the sensing circuitry (1) senses a power supply signal of the power-frequency transformer (T1) in work mode, the switching circuitry (3) shorts the resistive element (Z); and when the power-frequency transformer (T1) is in standby mode, the electronic switch (3) is switched off and the resistive element (Z) is coupled to the power-frequency transformer (T1). The circuit attached to the power adapter reduces the standby power consumption very much, and achieves energy-saving effect with low cost.

13 Claims, 2 Drawing Sheets

CIRCUIT FOR MINIMIZING STANDBY POWER IN POWER SUPPLY SYSTEMS

BACKGROUND OF THE INVENTION

1. Field of the Invention

The present invention relates generally to reducing the standby power consumption of electronic devices. More particularly, the present invention relates to a circuit adapted to minimize standby power in a power supply system.

2. Background

Nowadays, most household electrical appliances are powered by DC (Direct Current) power, which is generally generated by power converting devices called "power adapters". The power adapter inputs Power-frequency AC (Alternating Current) mains supply, which is generally 220V or 110V, and outputs low-voltage DC power to the household electrical appliances. Within the power adapters, the switch mode power-supply (SMPS) technology is applied; alternatively the Power-frequency transformer is applied to convert an AC mains supply to a low-voltage DC power supply. The power adapter using the Power-frequency transformer is thereinafter referred to as Power-frequency adapter. Generally, the power adapters are turned into standby mode when the electrical devices being powered are in a "sleep" mode or turned off. According to the present arts, the energy consumption of the Power-frequency adapter is often high, namely that its standby power consumption is high.

Conventional Power-frequency adapter often includes a Power-frequency transformer for lowering the voltage, a bridge rectifier, a filtering electrolytic capacitor, and an enclosure. The demand for them is huge and the competition is very keen. The Power-frequency transformer is often made from copper and silicon steel sheet, and has the disadvantages like big volume and heavy weight, but it also has the advantages such as high insulation resistance (easily achieved), good dielectric strength, good surge impact resistance, easy maintenance, and less electromagnetic radiation pollution, etc. Therefore, Power-frequency adapter still has a promising future, and its advantageous features can solve the problems that are very difficult to be overcame in the switch mode power supply technology.

In order to save the energies and protect the environment, many countries have issued successively the laws and regulations on energy-saving. For instance, the United States adopts the "Energy Star" Certification, which, with the help of the government of the United States, is aimed at promoting the environmental protection sense of business and individuals by certification of high-efficiency and energy-saving. After selecting and passing the test procedures strictly worked out by Environmental Protection Agency (EPA), the manufacturers of power adapters can gain the certificate of "Energy Star", which means that the power adapters of the manufacturers will be allowed to be exported to some countries and areas. Thus the "Energy Star" certification is very important. China Certification Center for Energy Conservation Product as a partner of EPA also works out the certification standard similar to "Energy Star".

The "Energy Star" Certification strictly specify the lower limit of energy utilization efficiency of power adapter at work mode, as well as the upper limit of energy consumption in standby mode. Furthermore it keeps pace with the times. For instance, it specifies the upper limit of standby power consumption of power adapter as follows: the standby power consumption of power adapter below 10 W can not exceed 0.3 W from Jul. 1, 2006; the standby power consumption of power adapter above 10 W but below 250 W can not be more than 0.5 W.

However, the standby power consumption of most power-frequency adapter is too much and far away from the standard of "Energy Star" Certification, which has become a technological problem.

SUMMARY OF THE INVENTION

To overcome the above problem, it is an objective of the present invention to provide a circuit minimizing standby power in a power supply system. In one embodiment of the present invention, the circuit includes a detecting and isolation sensing part coupled to an output of a power adapter in the power supply system; an electronic switch responsive to the detecting and isolation sensing part; and a resistive element coupled to the electronic switch and an input of the power adapter; when the detecting and isolation sensing part senses a power supply signal of the power adapter in work mode, the electronic switch shorts the resistive element; and when the power adapter is in standby mode, the electronic switch is switched off and the resistive element is coupled to the power adapter.

In the embodiment of the present invention, the circuit further includes an amplification and driving part to connect the detecting and isolation sensing part with the electronic switch. The detecting and isolation sensing part comprises a current transformer, and the output terminals of the current transformer are coupled to the amplification and driving part.

In some embodiments, double-voltage rectifying mode or multi-voltage rectifying modes are applied to the amplification and driving part for amplifying a sensing signal from the detecting and isolation sensing part, and a tri-pole transistor separating-element amplifier is applied for driving the electronic switch.

The resistive element is a resistance, or a capacitive reactance, or a combination of resistance and capacitive reactance, or a constant current source.

The electronic switch comprises a thyristor and a bridge rectifier; wherein the positive electrode of the thyristor is connected to the positive output terminal of the bridge rectifier; the negative electrode of the thyristor is connected to the negative output terminal of the bridge rectifier; the gate electrode of the thyristor is connected to the emitter electrode of the triode.

The amplification and driving part comprises a double-voltage rectification and drive circuit driving the electronic switch, which comprises: a capacitor and a negative electrode of a diode connected in series to a point; the other terminal of the capacitor connected to an output terminal of a current transformer; a positive electrode of the diode connected to the other output terminal of the current transformer; a negative electrode of a diode connected to the series connection point of the capacitor and the diode; a resistance and a capacitor connected in series to a point to which the negative electrode of the diode is connected; the other terminal of the resistance connected to a base electrode of a triode; the other terminal of the capacitor connected to the output terminal of the current transformer; a collector electrode of the triode and a collector electrode of a triode connected to each other and then connected to a resistance; the other terminal of the resistance connected to a positive electrode of a thyristor; an emitter electrode of the triode and a base electrode of the triode connected to a resistance, and then connected to the output terminal of the current transformer; the other terminal of the resistance connected to a negative electrode of the thyristor; and an emitter electrode of the triode connected to a gate electrode of the thyristor.

In some embodiments, the thyristor can be replaced by a crystal triode, a field effect transistor, or an IGBT transistor.

The circuit in accordance with the present invention reduces the standby power consumption very much, and achieves energy-saving effect with low cost, which meets the requirements for power consumption in standby mode as stipulated by "Energy Star" Certification.

DETAILED DESCRIPTION OF THE INVENTION

The principle and one or more specific embodiments of the present invention will be described below.

Figure 1:
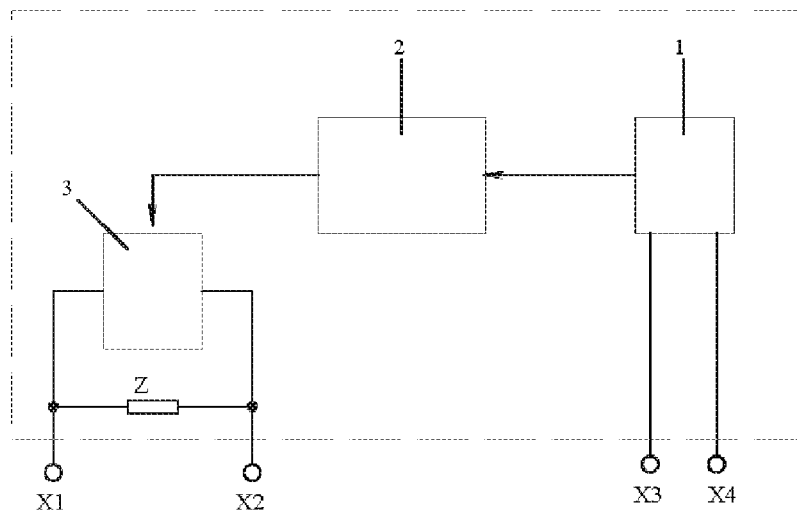
FIG. 1 is a block diagram of a circuit configured to minimize standby power consumption in accordance with one embodiment of the present invention.

Referring to FIG. 1, the block diagram as shown in FIG. 1 is a four-terminal network of which the input terminals are X3 and X4, while the output terminals are X1 and X2. The circuit configured to minimize standby power consumption in accordance with embodiments of the present invention comprises sensing circuitry 1, driving circuitry 2, switching circuitry 3 and a resistive element Z.

Figure 2:
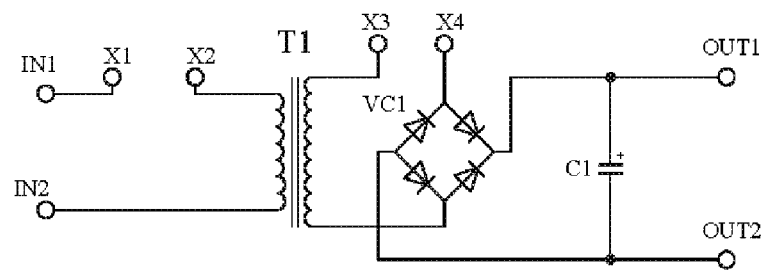
FIG. 2 is a schematic diagram of a conventional Power-frequency adapter.

Referring also to FIG. 2, terminals X1 and X2 disconnect the AC input on a primary side of a power-frequency transformer T1. Terminals X3 and X4 disconnect the AC output on the secondary side of the power-frequency transformer T1. If terminals X1 and X2 are connected with each other and terminals X3 and X4 are connected at the same time, the power-frequency transformer T1 is not interrupted by the circuit configured to minimize standby power consumption, so a power adapter using the power-frequency transformer T1 is still a conventional power-frequency adapter. The conventional power-frequency adapter generally comprises three parts, namely power-frequency transformer T1, bridge rectifier VC1 and filtering electrolytic capacitor C1. Among them, IN1 and IN2 are two terminals inputting power-frequency alternating current from the mains supply, while OUT1 and OUT2 are two terminals through which the power-frequency adapter outputs the low-voltage direct current.

Referring to FIG. 1 again, the block diagram has shown one embodiment of the present invention. Referring to the block diagram, the functions of each circuitry are respectively described as follows. Sensing circuitry 1 has the functions of detecting and isolation sensing. Sensing circuitry 1 detects out whether there is a power supply signal indicative of powering the electrical appliances in work mode, isolates it and then sends a corresponding sensing signal to the subsequent circuits. The power supply signal is input by two input terminals X3 and X4 of the four-terminal network. The driving circuitry 2 has the functions of signal amplification and driving. The driving circuitry 2 amplifies the weak sensing signal from the sensing circuitry 1 and outputs a corresponding driving signal to control the switching on/off of the switching circuitry 3. When the power supply is in work mode, the switching circuitry 3 is switched on; otherwise it is switched off. Two connecting terminals of the switching circuitry 3 are X1 and X2, namely the output terminals X1 and X2 of the four-terminal network. The resistive element Z is coupled in parallel between terminals X1 and X2. If the four terminals X1, X2, X3 and X4 in FIG. 1 are respectively connected to the four terminals X1, X2, X3 and X4 in FIG. 2, this becomes the design scheme for a "power-frequency adapter with ultra-low standby power consumption". Considering that the transmitted signal is AC signal, X1 in FIG. 1 can also be connected with X2 in FIG. 2; X2 in FIG. 1 can be connected with X1 in FIG. 2; X3 in FIG. 1 can be connected with X4 in FIG. 2; X4 in FIG. 1 can be connected with X3 in FIG. 2; the above connection is also correct. The at least one embodiment of each circuitry is described in detail in the next steps.

The resistive element Z is coupled in parallel between terminals X1 and X2. The resistive element Z is coupled in parallel with the switching circuitry 3. When on standby, the switching circuitry 3 is switched off, and the resistive element Z serves as the AC route of the primary side of the power-frequency transformer T1. Select a suitable value for resistive element Z so as to make a very small current passing through the primary side of power-frequency transformer T1 when on standby. When on standby, there is no current passing through the secondary side of the power-frequency transformer T1, but there is an induced voltage which is in direct proportion to the inductance of the primary side. At the time, if there is a load connected, the secondary side of the power-frequency transformer T1 has a small current which will be detected out by the sensing circuitry 1. The sensing circuitry 1 isolates it and sends a corresponding sensing signal to the driving circuitry 2. The driving circuitry 2 amplifies the sensing signal and then switches on the switching circuitry 3, so the resistive element Z is shorted, and the power-frequency adapter gains normal power supply.

When on standby, there is only about 1 mA current passing through the resistive element Z within the power-frequency adapter, so its standby power consumption is absolutely lower than that required by the standard of "Energy Star" Certification. The resistive element Z can be a resistance, a capacitive reactance, a combination of resistance and capacitive reactance, or a constant current source formed by electronic components. For convenience, a high resistance or a low capacitance can be adopted for the resistive element Z.

There are multiple circuits to realize the functions of each block in FIG. 1. The following is a preferred embodiment.

Sensing circuitry 1 detects whether the load of the power-frequency transformer T1 is in work mode, and then sends a corresponding signal to the subsequent circuit. In this embodiment, the Sensing circuitry 1 comprises a current transformer T2. As shown by dashed line box A of FIG. 3, when in standby mode, there is no current on the secondary side of the power-frequency transformer T1, and the induced voltage of the secondary side of the current transformer T2 is zero. Once the load being started on by the power adapter, there is a small current passing through the secondary side of the power-frequency transformer T1, and the induced voltage of the secondary side of the current transformer T2 becomes above zero. The small current passing through the secondary side of power-frequency transformer T1 works as a power supply signal, and the current transformer T2 senses it and generates the induced voltage in the secondary side thereof as the sensing signal corresponding to the power supply signal. To promote the induced voltage of the secondary side of the current transformer T2 as far as possible, the magnetic materials with high magnetic permeability, as well as suitable ratio of primary to secondary coils will be selected therein. The current transformer T2 can also isolate the circuit from the power adapter when the power adapter is in normal work mode. In normal work mode, the current transformer T2 induces the small current of the power-frequency transformer T1 but doesn't influence it, so the power-frequency transformer T1 works independently in normal work mode.

As described above, the sensing circuitry 1 is a kind of "electricity-to-magnetism-to-electricity" converter. There are multiple kinds of circuits which can realize the conversion of "electricity-to-magnetism-to-electricity". Besides the current transformer, the Hall elements, magneto-dependent sensor (Wiegand device), electret elements and so forth, once used suitably, also can realize the conversion of "electricity-to-magnetism-to-electricity".

Driving circuitry 2 is responsible for amplifying the weak sensing signal from the sensing circuitry 1, and controlling the switching on/off of the switching circuitry 3. As shown in dashed line box B of FIG. 3, capacitors C3 and C4 as well as diodes VD1 and VD2 form a double-voltage rectification circuit which not only performs the amplification but also generates a DC driving signal adapted for driving the switching circuitry 3. If the magnification factor of the double-voltage rectification circuit is not enough, the multi-voltage rectification circuit can be adopted, for instance, a tri-voltage rectification circuit as shown in FIG. 4.

Figure 3:
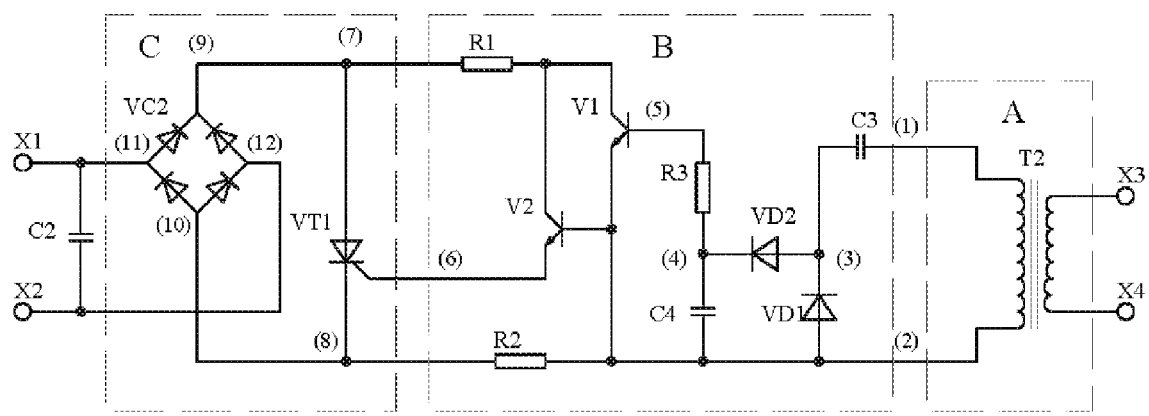
FIG. 3 is a schematic diagram of the circuit shown in the FIG. 1 configured to minimize standby power consumption in accordance with one embodiment of the present invention.
Figure 4:
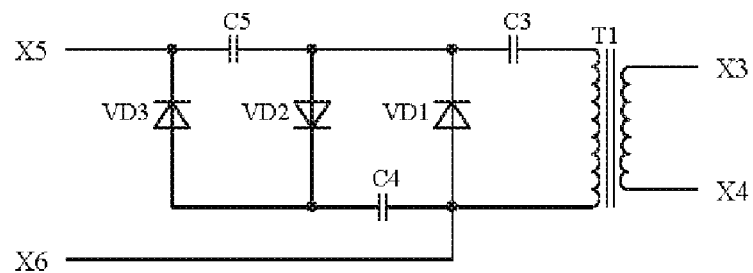
FIG. 4 is a schematic diagram of a tri-voltage rectifying circuit applied in the present invention.

In the dashed line box B of FIG. 3, resistances R1, R2 and R3 as well as triodes V1 and V2 form an circuit with amplification and driving functions, which amplifies the DC driving signal of the double-voltage rectification circuit to gain a power enough to control the switching on/off of the switching circuitry 3. The circuit formed by the resistances R1, R2 and R3 as well as the triodes V1 and V2 is a kind of tri-pole transistor separating-element amplifier.

The circuits in the dashed line box B are connected as follows: the capacitor C3 and the negative electrode of the diode VD1 are connected in series to a series connection point (3); the other terminal of the capacitor C3 is connected to an output terminal (1) of the current transformer T2; the positive electrode of the diode VD1 is connected to the other output terminal (2) of T2; the positive electrode of VD2 is connected to the series connection point (3) of the capacitor C3 and the diode VD1; the resistance R3 and the capacitor C4 are connected in series to a point (4) to which the negative electrode of the diode VD2 is connected; the other terminal of the resistance R3 is connected to the base electrode of the triode V1; the other terminal of the capacitor C4 is connected to the output terminal (2) of T2; the collector electrodes of the triodes V1 and V2 are connected with each other and then connected to the resistance R1; the other terminal of the resistance R1 is connected to a positive electrode (7) of a thyristor VT1; the emitter electrode of the triode V1 and the base electrode of the triode V2 are connected to a resistance R2, and then connected to the output terminal (2) of the current transformer T2; the other terminal of the resistance R2 is connected to the negative electrode (8) of the thyristor VT1 while the emitter electrode of the triode V2 is connected to the gate electrode (6) of the thyristor VT1.

One embodiment of the switching circuitry 3 is shown in the dashed line box C of the FIG. 3. When the load is connected with the power supply, the switching circuitry 3 shall be switched on; otherwise it shall be switched off. As shown in the dashed line box C of the FIG. 3, the switching circuitry 3 comprises the thyristor VT1 and a bridge rectifier VC2. The detailed connection is as follows: the positive electrode (7) of the thyristor VT1 is connected to the positive output terminal (9) of the bridge rectifier VC2; the negative electrode (8) of the thyristor VT1 is connected to the negative output terminal (10) of the bridge rectifier VC2; the gate electrode (6) of the thyristor VT1 is connected to the emitter electrode of the triode V2; the AC input terminals (11) and (12) serve as the output terminals X1 and X2 of the four-terminal network. The resistive element Z is a capacitance C2 connected between X1 and X2. The thyristor VT1 is a "semi-controlled" element which can be replaced by "all-controlled" elements such as crystal triode, field effect transistor, IGBT transistor, etc.

When the load is connected with the power supply, the emitter electrode of the triode V2 outputs the current to trigger the gate electrode of the thyristor VT1, and the thyristor VT1 switches into conduction. Then, X1 and X2 are disconnected through the diodes in the bridge rectifier VC2, thus the resistive element Z is shorted, and the power-frequency adapter gets normal power supply.

There are many kinds of circuits which can be used for amplification, driving and switching, so the circuits shall be selected according to the cost, technical situation and the possibility of volume miniaturization.

On the whole, the circuit minimizing standby power in a power supply system in accordance with embodiments of the present invention is a four-terminal network, of which the input terminals are X3 and X4, and the output terminals are X1 and X2; the input terminals X3 and X4 are connected in series to the secondary side of the power-frequency transformer T1 of the power adapter, while the output terminals X1 and X2 are connected in series to the primary side of the power-frequency transformer T1; the four-terminal network comprises sensing circuitry, driving circuitry, switching circuitry and a resistive element.

The first part of the four-terminal network is used as the detecting and isolation sensing part, which, in fact, is an "electricity-to-magnetism-to-electricity" converter. The current transformer shall be a preferred selection for the "electricity-to-magnetism-to-electricity" converter. However, of course, the Hall elements, magneto-dependent sensor (Wiegand device), electret elements also can be adopted for this part.

The second part of the four-terminal network is used as the signal amplification and driving part. Double-voltage rectifying or multi-voltage rectifying circuits are preferred selection for amplifying a sensing signal from the first part of the circuit; and tri-pole transistor separating-element amplifier is a preferred selection as the driving part.

The third part of the four-terminal network is an electronic switch and a resistive element. The resistive element shall be connected to the two output terminals X1 and X2 of the four-terminal network, and in parallel connection with the electronic switch. A thyristor and a bridge rectifier are preferred selection to form the electronic switch.

when the detecting and isolation sensing part senses a power supply signal of the power adapter in work mode, the electronic switch shorts the resistive element; and when the power adapter is in standby mode, the electronic switch is switched off and the resistive element is coupled to the power adapter.

Figure 5:
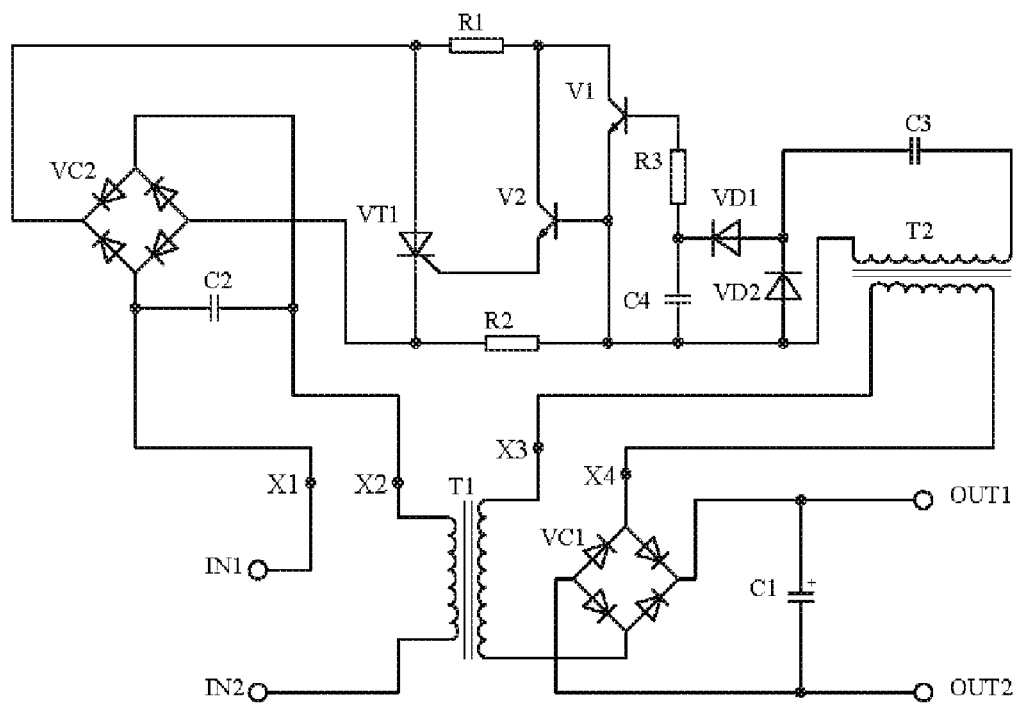
FIG. 5 is a schematic diagram of the circuit shown in the FIG. 3 coupled to the conventional Power-frequency adapter shown in the FIG. 2.

If the four-terminal network of the circuit minimizing power in standby mode is integrated as a module and attached to or within an ordinary power-frequency adapter, the ordinary power-frequency adapter will become a low standby power-consumption power-frequency adapter. FIG. 5 shows the overall circuit diagram of this kind of power-frequency adapter, which is composed of circuits in FIG. 2 and FIG. 3.

What is claimed is:

1. A circuit minimizing standby power in a power adapter with a power-frequency transformer (T1), comprising:
    a four-terminal network, comprising a pair of input terminals (X3) and (X4) and a pair of output terminals (X1) and (X2), the input terminals (X3) and (X4) coupled in series to a secondary side of the power-frequency transformer (T1), and the output terminals (X1) and (X2) connected in series to a primary side of the power-frequency transformer (T1), and
    the four-terminal network comprising a sensing circuitry (1), a driving circuitry (2), a switching circuitry (3) and a resistive member (Z),
    wherein the switching circuitry (3) comprises a thyristor (VT1) and a bridge rectifier (VC2); wherein a positive electrode (7) of the thyristor (VT1) is connected to a positive output terminal (9) of the bridge rectifier (VC2); a negative electrode (8) of the thyristor (VT1) is connected to a negative output terminal (10) of the bridge rectifier (VC2); a gate electrode (6) of the thyristor (VT1) is connected to an emitter electrode of a triode (V2); AC input terminals (11) and (12) of the bridge rectifier (VC2) serve as the output terminals (X1) and (X2) of the four-terminal network; a capacitor (C2) serves as the resistive member (Z) connected between the output terminals (X1) and (X2).

2. The circuit as claimed in claim 1, wherein the sensing circuitry (1) comprises a current transformer (T2) of which the input terminals serve as the input terminals (X3) and (X4) of the four-terminal network, and the output terminals of current transformer (T2) are coupled to the driving circuitry (2).

3. The circuit as claimed in claim 1, wherein double-voltage rectifying mode or multi-voltage rectifying modes are applied to the driving circuitry (2) for amplifying a sensing signal from the sensing circuitry (1), and a tri-pole transistor separating-element amplifier is applied to the driving circuitry (2) for driving the switching circuitry (3).

4. The circuit as claimed in claim 1, wherein the resistive member (Z) is coupled in parallel between the pair of output terminals (X1) and (X2) of the four-terminal network; the resistive member (Z) is a resistance, or a capacitive reactance, or a combination of resistance and capacitive reactance, or a constant current source.

5. The circuit as claimed in claim 1, wherein the driving circuitry (2) comprises a double-voltage rectification and drive circuit driving the switching circuitry (3), which comprises: a capacitor (C3) and a negative electrode of a diode (VD1) connected in series to a point (3); the other terminal of the capacitor (C3) connected to an output terminal (1) of a current transformer (T2); a positive electrode of the diode (VD1) connected to the other output terminal (2) of the current transformer (T2); a negative electrode of a diode (VD2) connected to the series connection point (3) of the capacitor (C3) and the diode (VD1); a resistance (R3) and a capacitor (C4) connected in series to a point (4) to which the negative electrode of the diode (VD2) is connected; the other terminal of the resistance (R3) connected to a base electrode of a triode (V1); the other terminal of the capacitor (C4) connected to the output terminal (2) of the current transformer (T2); a collector electrode of the triode (V1) and a collector electrode of a triode (V2) connected to each other and then connected to a resistance (R1); the other terminal of the resistance (R1) connected to a positive electrode (7) of a thyristor (VT1); an emitter electrode of the triode (V1) and a base electrode of the triode (V2) connected to a resistance (R2), and then connected to the output terminal (2) of the current transformer (T2); the other terminal of the resistance (R2) connected to a negative electrode (8) of the thyristor (VT1); and an emitter electrode of the triode (V2) connected to a gate electrode (6) of the thyristor (VT1).

6. The circuit as claimed in claim 1, wherein the thyristor (VT1) can be replaced by a crystal triode, a field effect transistor, or an IGBT transistor.

7. A circuit minimizing standby power in a power supply system, said circuit comprising:
    a detecting and isolation sensing part (1) coupled to an output of a power adapter (T1) in the power supply system;
    an electronic switch (3) responsive to the detecting and isolation sensing part (1);
    a resistive element (Z) coupled to the electronic switch (3) and an input of the power adapter (IN1, IN2); and
    an amplification and driving part (2) to connect the detecting and isolation sensing part (1) with the electronic switch (3),
    wherein when the detecting and isolation sensing part (1) senses a power supply signal of the power adapter in work mode, the electronic switch (3) shorts the resistive element (Z); and when the power adapter (T1) is in standby mode, the electronic switch (3) is switched off and the resistive element (Z) is coupled to the power adapter.

8. The circuit as claimed in claim 7, wherein the detecting and isolation sensing part (1) comprises a current transformer (T2), and the output terminals of the current transformer (T2) are coupled to the amplification and driving part (2).

9. The circuit as claimed in claim 7, wherein double-voltage rectifying mode or multi-voltage rectifying modes are applied to the amplification and driving part (2) for amplifying a sensing signal from the detecting and isolation sensing part (1), and a tri-pole transistor separating-element amplifier is applied for driving the electronic switch (3).

10. The circuit as claimed in claim 7, wherein the resistive element (Z) is a resistance, or a capacitive reactance, or a combination of resistance and capacitive reactance, or a constant current source.

11. A circuit minimizing standby power in a power supply system, said circuit comprising:
    a detecting and isolation sensing part (1) coupled to an output of a power adapter (T1) in the power supply system;
    an electronic switch (3) responsive to the detecting and isolation sensing part (1); and
    a resistive element (Z) coupled to the electronic switch (3) and an input of the power adapter (IN1, IN2),
    wherein the electronic switch (3) comprises a thyristor (VT1) and a bridge rectifier (VC2); wherein a positive electrode (7) of the thyristor (VT1) is connected to a positive output terminal (9) of the bridge rectifier (VC2); a negative electrode (8) of the thyristor (VT1) is connected to a negative output terminal (10) of the bridge rectifier (VC2); a gate electrode (6) of the thyristor (VT1) is connected to the emitter electrode of the triode (V2); and
    wherein when the detecting and isolation sensing part (1) senses a power supply signal of the power adapter in work mode, the electronic switch (3) shorts the resistive element (Z); and when the power adapter (T1) is in standby mode, the electronic switch (3) is switched off and the resistive element (Z) is coupled to the power adapter.

12. The circuit as claimed in claim 11, wherein the amplification and driving part (2) comprises a double-voltage rectification and drive circuit driving the electronic switch (3), which comprises: a capacitor (C3) and a negative electrode of a diode (VD1) connected in series to a point (3); the other terminal of the capacitor (C3) connected to an output terminal (1) of a current transformer (T2); a positive electrode of the diode (VD1) connected to the other output terminal (2) of the current transformer (T2); a negative electrode of a diode (VD2) connected to the series connection point (3) of the capacitor (C3) and the diode (VD1); a resistance (R3) and a capacitor (C4) connected in series to a point (4) to which the negative electrode of the diode (VD2) is connected; the other terminal of the resistance (R3) connected to a base electrode of a triode (V1); the other terminal of the capacitor (C4) connected to the output terminal (2) of the current transformer (T2); a collector electrode of the triode (V1) and a collector electrode of a triode (V2) connected to each other and then connected to a resistance (R1); the other terminal of the resistance (R1) connected to a positive electrode (7) of a thyristor (VT1); an emitter electrode of the triode (V1) and a base electrode of the triode (V2) connected to a resistance (R2), and then connected to the output terminal (2) of the current transformer T2; the other terminal of the resistance (R2) connected to a negative electrode (8) of the thyristor (VT1); and an emitter electrode of the triode (V2) connected to a gate electrode (6) of the thyristor (VT1).

13. The circuit as claimed in claim 11, wherein the thyristor (VT1) can be replaced by a crystal triode, a field effect transistor, or an IGBT transistor.

\* \* \* \* \*